Jan. 15, 1929.
C. N. FAIRCHILD
1,699,183
EMERGENCY CUT-OUT LOCK
Filed June 12, 1926
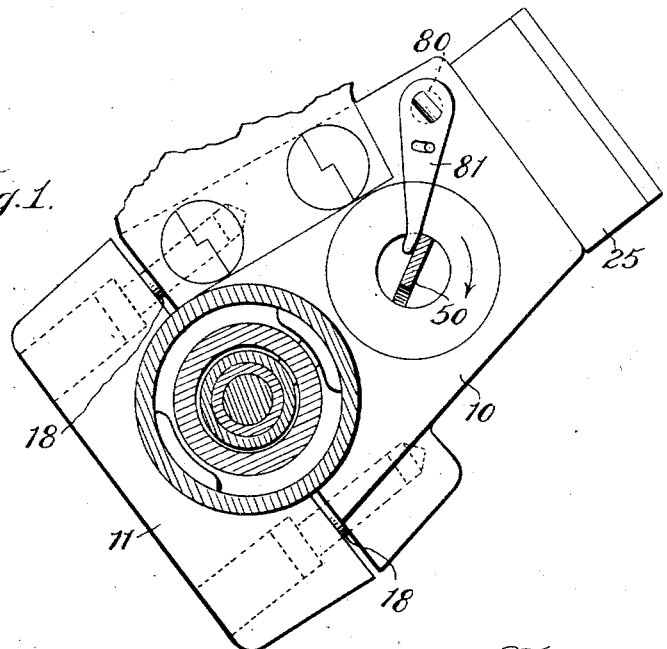
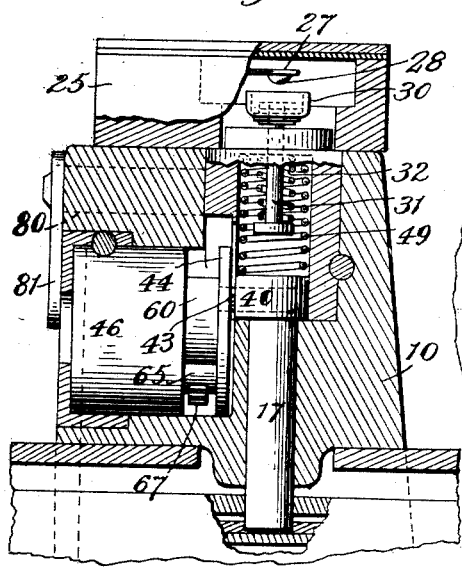
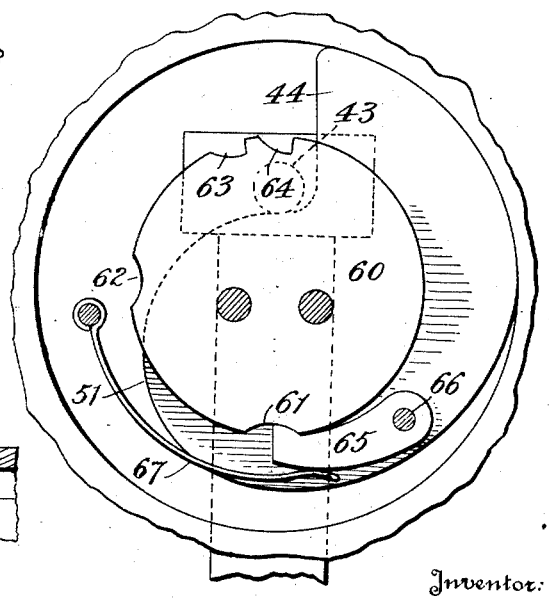
Witness:
Jas. Es. Hutchinson.
Inventor:
Charles N. Fairchild,
By H. H. Snelling
Attorney.

Patented Jan. 15, 1929.

1,699,183

UNITED STATES PATENT OFFICE.

CHARLES N. FAIRCHILD, OF NEW HAVEN, CONNECTICUT.

EMERGENCY CUT-OUT LOCK.

Application filed June 12, 1926. Serial No. 115,561.

This invention relates to automobile locks and has for its object the provision of an automobile lock to meet the severe requirements of the Underwriters' group 1A and with additional advantages. To meet these requirements the ignition and the lock must be controlled by the same mechanism and be dependent one on the other. This of course is true of all coincidental locks. The lock must be designed that when it has been turned to running position the key can not be reversed but must be turned in the same direction to completion of its travel, usually 360° at which time it is free to be withdrawn but the interior mechanism of the lock must be such that either the closing of the ignition be simultaneous with the locking of some part usually the steering post or that the breaking of the ignition circuit shall take place after the steering post locking bolt is shot into position and in addition that the steering post locking mechanism shall not operate until after or at least simultaneously with the withdrawing of the key from the lock.

It might be dangerous in rare circumstances to have a lock even tho meeting these requirements but in which an appreciable time was required to shift from running position to unlocked position with the ignition circuit broken. An example of the need for a rapid breaking of the ignition circuit without locking the car would exist for example in case the accelerator in any way should become stuck or jammed while on. An important feature of the present invention is the provision of means for instantly breaking the ignition circuit by a very slight movement of the key while the car is running and simultaneously to insure that when the ignition circuit is thus broken with the steering post lock naturally withdrawn as the car is running the key shall be locked in position so that it can not possibly be removed without first locking the car.

In the present lock the important feature of the provision of a third position is maintained, this position being at a 180° turn of the key which will permit the use of disk locks as well as pin plunger locks. In the latter the lock can be made so that the key can be withdrawn in any position at all but with disk locks the key can be withdrawn only at 180° and 360°. The obvious purpose of the third position is to permit the car to be shifted about in a public garage for example or primarily for convenience in shipping the car from the factory, the car being shipped with the lock in third position and the key being forwarded to the owner or branch by mail. While the lock is in third position the car can be moved about in any way but can not be driven because the ignition is locked open.

In the drawings:—

Figure 1 shows an elevation of the lock from the key side with parts broken away.

Figure 2 is a vertical section showing the locking bolt.

Figure 3 is a view of the ratchet plate.

This invention may be considered as an improvement on the lock shown in my Patent No. 1,592,091, dated July 13, 1926, this device being a third position lock while the device of the present application covers all those features and in addition makes it possible to snap quickly the ignition to "off" position in case of emergency while running.

The housing 10 has a housing cap 11 each with a semi-cylindrical bore to receive the steering post casing. The cap is secured to the housing by means of screws 18. The switch box 25 is of metal having within a molded porcelain base in which are mounted the contacts 27 and 28 which are bridged by the metal cup 30 insulated from its stem 31 and ordinarily urged downwardly into circuit opening position by a spring 32.

The locking bolt 17 slides freely in its bore as far as permitted by its enlarged head 40 which is urged downwardly into steering post locking position by a relatively heavy spring 49. The bolt is withdrawn by a cam 44 fast to the revolving cylinder of the lock, the barrel of which is numbered 46 in the drawings. A ratchet disk 60 which is an important element of the present combination is also relatively fixed with respect to the cylinder and the cam so that these three parts invariably turn as a unit.

Proper movement of the cylinder of the lock by means of its key 50 turns the cam 44 so that the lug or pin 43 on the head 40 raises up the spiral arc or curve 51 to the 180° point at which time the spring 49 is compressed, the bolt 17 entirely withdrawn from locking engagement and contact is made between the head 40 of the locking bolt and the stem 31, but the latter is not lifted to close the ignition circuit.

The ratchet disk or plate 60 carries four indentations 61, 62, 63 and 64, each of which in turn is engaged by a pawl 65 pivoted as at 66 to the barrel 46 of the lock and held against the edge of the ratchet 60 or in any one of the indentations, if they are in registry, by means of a leaf spring 67 preferably also secured to the barrel of the lock altho it may be secured to the housing.

As seen in Figures 1 and 3 the ratchet plate turns in a clockwise direction. When the plate is in locking position the pawl 65 engages the indentation 61 and as far as this indentation is concerned the ratchet 60 may be turned in either direction but reverse or counterclockwise movement of the cylinder and disk is prevented by locking movement between the radial edge of the cam 44 and the pin 43 and also by engagement between the key and the lever 81 on the rock shaft 80. When the key turns the ratchet 60 180° the pawl 65 drops into the one-way indentation or notch 64 and absolutely bars reverse movement of the cylinder. As is common with disk locks, which are rapidly taking the place of pin plunger locks in this field, the key may be withdrawn at this position, this being the so-called "third position" in the steering post locking art. The notch 63, located at 190° from the normal key inserting position at 0° is likewise one-way only and is positioned a conveniently short distance from the 180° indentation 64. The notch 63 prevents movement back to third position. When the pawl 65 is in the notch 63 the circuit is broken or opened but as the cylinder is turned to bring the pawl between the notches 63 and 61 in proximity to the two-way notch 62 the circuit is closed and ignition is on. The notch 62 is engaged by the pawl 65 in ordinary running position and the spring 67 is quite strong enough to hold the cylinder in running position when the pawl is in engagement with the notch 62 but movement of the key will readily turn the cylinder to the 360° point with the ignition still on or by turning it in a reverse direction the lock can with great ease be turned back to the notch 63 in engagement with the pawl with the ignition open.

The description of the operation of the lock in general is amply covered in the description in my patent cited. The additional feature of the present invention lies in the two-way notches 61 and 62 and in the new notch 63. Assuming the car is locked the driver puts in the key and can only turn it in one direction. The key can be turned almost to 180° with freedom to return the key. The ignition is off during such time altho the locking bolt is completely withdrawn at about 175°. At 180° the pawl catches in notch 64 and holds it against reverse movement. At this 180° or mid position the bolt is entirely withdrawn, the ignition is open and the key may be withdrawn but can not be turned back; in other words the driver can take the key out or take the only other option, turn it forward so that the notch 63 is caught. At this latter point all parts are in exactly the same position as before except that now the key can not be withdrawn nor can the cylinder be turned back to 180°. This position has no name as it is merely a safety position. The driver may only turn in forward or clockwise direction. At about 270°, which is the running position, the pawl 65 catches in the notch 62 and holds it there. The driver has two options however. He can turn it forward to 360° without moving the locking bolt from unlocked position or the make and break mechanism, from "on" or he can move the key backward to the safety position which has no effect on the bolt but does break the circuit. In this emergency position the ignition circuit is broken, the wheel is not locked and the driver may steer. At 360° the notch 61 permits reverse movement back to running position or in case of emergency all the way to safety position so that at 360° the operator can break the ignition circuit in two ways, one by turning the key back which has no effect on the locking bolt and the other by pulling the key out which does advance and lock the bolt.

What I claim is:—

1. In a coincidental lock, a locking member, an ignition circuit make and break mechanism, a key operated revolving cylinder lock in which the key can be removed from the lock in two different positions, means movable with the lock cylinder for moving the locking member to unlocking position upon turning movement of the cylinder approximately to the first key removable position, and for moving the mechanism to "on" position upon movement a distance beyond said first key removable position and means for preventing reverse movement of the key upon reaching said first key removable position, and for preventing reverse movement of the key from "on" position to the first key removable position.

2. In a coincidental lock, a locking member, an ignition circuit make and break mechanism, a key operated revolving cylinder lock in which the key can be removed from the lock in two different positions, means movable with the lock cylinder for moving the locking member to unlocking position upon turning movement of the cylinder approximately to the first key removable position, and for moving the mechanism to "on" position upon movement a distance beyond said first key removable position and means for preventing reverse movement of the key upon reaching said first key removable position, and for yieldingly holding the lock cylinder in running or "on" position so that the cylinder may be reversed from "on" position to "off" position between running and first key removable position but cannot be reversed to key removable position.

3. In a coincidental lock, a locking member, an ignition make and break mechanism, key operated means for withdrawing the locking member and moving the mechanism to "on" position, and means for preventing reverse movement of the key operated means to key withdrawal position while permitting reverse movement from ignition "on" to ignition "off" without advancing the bolt.

4. In combination, a lock cylinder having a definite key inserting position, a plate attached thereto having a one-way notch 180° from said position, a one-way notch beyond the 180° position, and a two-way notch at running position between the second one-way notch and the key removing position which corresponds to the key inserting position.

5. The device of claim 1 in which the last named means comprises a spring pressed pawl and a plate attached to the lock cylinder, said plate having a one-way notch 180° from normal key inserting position, a one-way notch beyond said 180° position, and a two-way notch at running position between the second one-way notch and the 360° position.

6. In a coincidental lock, a locking member, an ignition make and break mechanism, key operated means for withdrawing the locking member and moving the mechanism to "on" and "off" positions and means for locking the key in the lock while free to turn from "on" to "off" and back without advancing the locking bolt.

7. In combination, a locking member, a disk cylinder for withdrawing said locking member prior to reaching first key removing position at 180° from normal key inserting position at 0°, means for preventing reverse movement from 360° to 180° while permitting reverse movement from 360° to approximately 190° from normal key inserting position and means operable upon withdrawal of the key at 360° for advancing the locking member to locking position.

In testimony whereof I affix my signature.

CHARLES N. FAIRCHILD.